United States Patent
Prokopuk

(10) Patent No.: US 7,876,224 B2
(45) Date of Patent: Jan. 25, 2011

(54) AIRBORNE DEPLOYED RADIO FREQUENCY IDENTIFICATION SENSING SYSTEM TO DETECT AN ANALYTE

(75) Inventor: Nicholas Prokopuk, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 349 days.

(21) Appl. No.: 12/056,915

(22) Filed: Mar. 27, 2008

(65) Prior Publication Data

US 2009/0243855 A1  Oct. 1, 2009

(51) Int. Cl.
*G08B 13/14* (2006.01)
(52) U.S. Cl. .................. 340/572.1; 340/445; 340/521; 342/463; 342/50
(58) Field of Classification Search ............ 340/572.1, 340/445, 459, 505, 521; 342/463, 50
See application file for complete search history.

(56) References Cited

U.S. PATENT DOCUMENTS

| | | | | |
|---|---|---|---|---|
| 4,193,057 A | * | 3/1980 | Bennett et al. | ............... 367/153 |
| 5,227,783 A | * | 7/1993 | Shaw et al. | ............ 340/870.19 |
| 2003/0218540 A1 | * | 11/2003 | Cooper et al. | .......... 340/539.26 |
| 2006/0176169 A1 | * | 8/2006 | Doolin et al. | ................ 340/521 |

* cited by examiner

*Primary Examiner*—George A Bugg
*Assistant Examiner*—Hongmin Fan
(74) *Attorney, Agent, or Firm*—Robert Lerma; Christopher L. Blackburn

(57) ABSTRACT

The invention generally relates to an airborne deployed passive radio frequency identification system and a method to identify an analyte and then to communicate a result of the analyte identification to a receiving station for an analysis and generation of a set of recommended actions. The invention will enhance the situational awareness and preparedness of forward deployed combat troops or security forces by assessing the presence of benign substances or hazardous substances as they advance and enter an area.

18 Claims, 8 Drawing Sheets

AIRBORNE DEPLOYED RADIO FREQUENCY IDENTIFICATION SENSING SYSTEM TO DETECT AN ANALYTE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefore.

BACKGROUND OF THE INVENTION

1. Field of the Invention

The invention generally relates to an airborne deployed passive radio frequency identification system and a method to identify an analyte and then to communicate a result of the analyte identification to a receiving station for an analysis and generation of a set of recommended actions. The invention will enhance the situational awareness and preparedness of forward deployed combat troops or security forces by assessing the presence of hazards as they advance and enter a hazardous zone.

2. Description of Related Art

Historically, exploitation of passive radio frequency identification (RFID) tag technology to track items of manufacture is known. A typical commercial RFID system is composed of an electronic device capable of rendering a response containing encoded information when interrogated. The encoded information is transmitted via a wireless link to the interrogating unit and processed either by a software algorithm executing on a computer or viewed by a user on a display.

An advanced type of RFID system renders upon interrogation a particular encoded piece of information. The particular information rendered by advanced RFID systems is dynamically ascertained as a result of exposing a sensing element to a substance that the sensing element is designed to detect. Sensing and then rendering the presence or absence of a specific substance is accomplished by integrating an RFID electronic device with a sensing element.

What is lacking in the area of RFID systems is an RFID system deployable ahead of an advancing military unit or security force that automatically identifies a hazardous analyte, upon interrogation autonomously transmits to a receiving station the identity of the hazardous analyte, locates with GPS precision a position of the hazardous analyte, then develops a set of recommended precautions specific to the hazardous analyte and then conveys the set of recommended precautions to a user.

Information relevant to attempts to address these problems can be found in U.S. Pat. No. 7,040,139 which is titled a Sensor Arrangement. However, this reference suffers from one or more of the following disadvantages: it is commercial in nature, it does not lend itself to be exploited in a forward deployed manner and is not described as operating outside of a container.

Additional information relevant to attempts to address these problems can be found in a Patent Application Publication No. 2006/60181414, titled as Radio Frequency Identification (RFID) Based Sensor Networks. However, this reference suffers from one or more of the following disadvantages: it is commercial in nature, it does not lend itself to be exploited in a forward deployed manner and it does not develop a set of recommended actions based upon the presence of a particular analyte.

SUMMARY OF THE INVENTION

The present invention is directed to an apparatus and method that satisfies the need for an RFID system which is deployable ahead of an advancing military unit or security force that automatically identifies a hazardous analyte, upon interrogation autonomously transmits to a receiving station the identity of the hazardous analyte, locates with GPS precision a position of the hazardous analyte, then develops a set of recommended precautions specific to the hazardous analyte and then conveys the set of recommended precautions to a user for the purpose of increasing the probability of mission success. The apparatus and method is a system that includes a delivery vehicle and a canister containing a plurality of RFID devices. Each one of the individual RFID devices is comprised of electronic circuitry integrated with a sensing array. A sensing array is comprised of multiple detectors, where each detector is sensitive to a single analyte or is sensitive to a different analyte. In either configuration, all of the detectors in the array are integrated with a single set of electronics.

An interrogator is integrated with the delivery vehicle for sending an interrogation signal to the RFID device wherein the interrogation signal also powers the RFID electronic circuitry. Once the RFID electronic circuitry is powered the RFID device transmits the status of the sensor portion of the RFID device to a receiver, which is integrated with the delivery vehicle. The interrogator then repeats the interrogation for each RFID device. The response to each interrogation is processed by an interrogation and response processor and assembled into a message that is transmitted via telemetry to a receiving station. The transmitted telemetry message is decoded by computer operated software contained within the receiving station. The computer operated software converts the contents of the transmitted telemetry message into a series of alerts and recommended measures. A user then incorporates the information conveyed in the series of alerts and recommended measures into a strategy to minimize the effect of any hazardous material.

Generally, the method comprises seeding a geographic area with a plurality of RFID devices for the purpose of creating a monitored area, then sweeping an interrogator over the monitored area, then interrogating the plurality of RFID devices seeding the geographic area for the purpose of ascertaining a detection result as determined by the plurality of RFID devices, then compiling the detection results reported by the RFID devices, then marking a position of the responding RFID device, then transmitting a telemetry formatted message containing the compilation of detection results with the position data to a ground receiving station and then processing the compilation results at the ground station for the purpose of presenting a set of recommendations to a user.

BRIEF DESCRIPTION OF THE DRAWINGS

The features described above, other features, aspects, and advantages of the present invention will become better understood with regard to the following description, appended claims, and accompanying drawings where:

DETAILED DESCRIPTION OF THE PREFERRED EMBODIMENT

Figure 1:
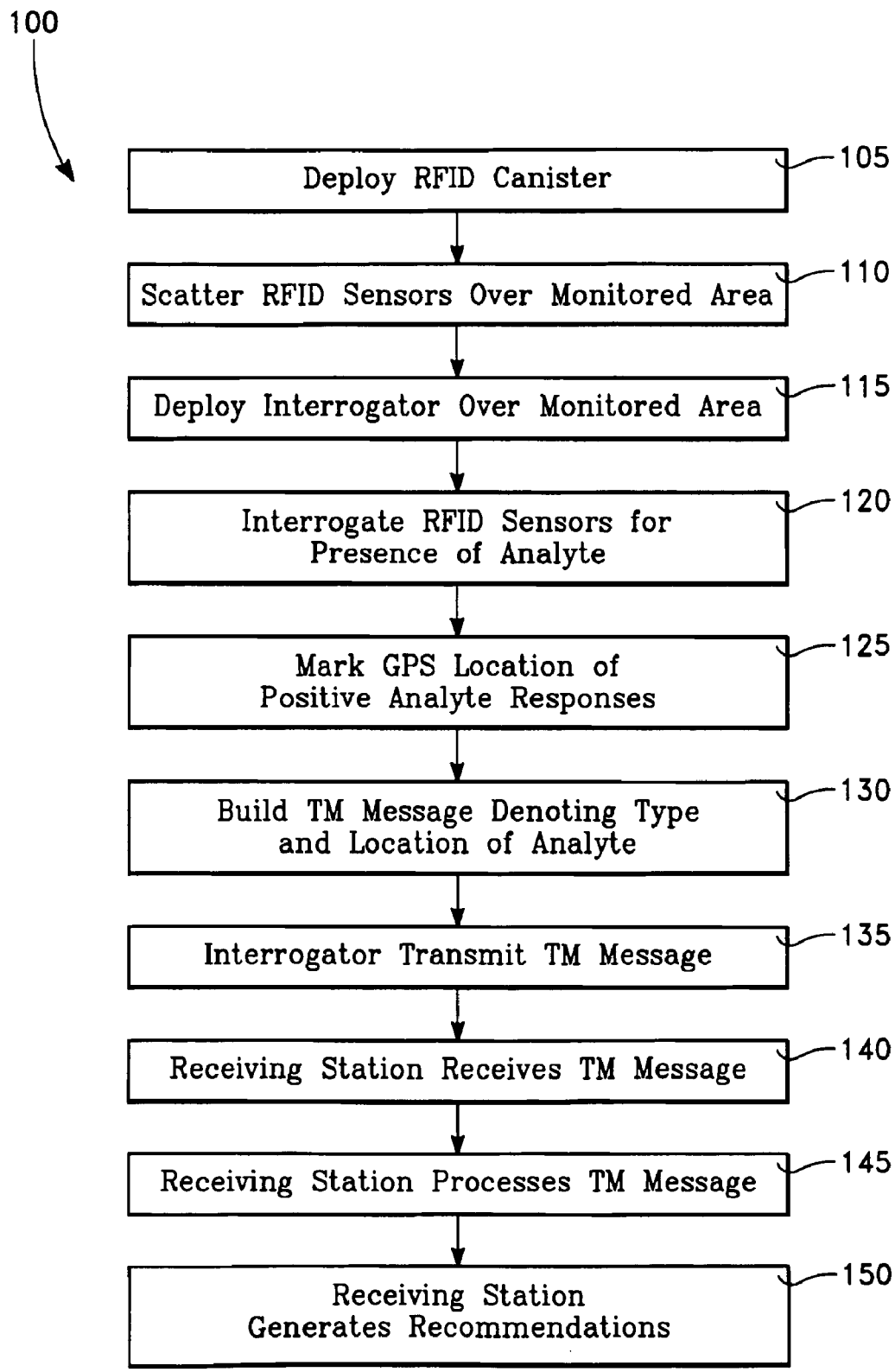
FIG. 1 is a high level functional block diagram of the preferred embodiment showing the major functions of the airborne deployed radio frequency identification system.

Referring to FIG. 1, shown is a high level functional block diagram 100 generally describing the major functions of an airborne passive radio frequency identification system (RFID). The passive RFID system is used to identify an analyte that is present in a forward area slated for occupation by combat or security forces. The operation of the passive RFID system begins with the deployment of a canister (step 105) filled with a plurality of RFID sensors set to sense an analyte. The RFID sensors are scattered throughout the area to be monitored (step 110) during the final stages of the canister deployment. Once the RFID sensors are scattered throughout the area to be monitored, an interrogator is deployed in a spiral pattern (step 115).

An analyte is any substance detectable by any of the scattered RFID sensors. Examples of hazardous substances are explosive agents, chemical agents, biological agents or nuclear radiation. An example of a non-hazardous substances are known chemical taggants. The RFID sensor is an electronic device having an antenna for both receiving an interrogation signal and transmitting a reply signal, a computer memory for storing programming information and data, electronic circuitry for coupling the computer memory to the antenna and an interface coupling an analyte sensor to the computer memory. One skilled in the art of RFID devices is familiar with RFID sensors of this type. One suitable example of an RFID device integrated with a sensing element can be found in United States Patent Application Publication numbered US 2005/0263790A1 having a publication date of Dec. 1, 2005 and titled GAN-BASED SENSOR NODES FOR IN SITU DETECTION OF GASES, which is herein incorporated by reference.

As the RFID sensor interrogation responses are collected by the interrogator the location of a responding RFID sensor is marked with a Global Positioning Satellite system coordinate (step 125). Software processing of the collected RFID sensor responses are performed onboard the interrogator resulting in a telemetry formatted message containing the analyte type and location (step 130). The telemetry formatted message is then transmitted (step 135) to a receiving station. Upon receipt of the telemetry formatted message (step 140) at the receiving station hardware and software components are used to perform signal processing to unpack the data contained in the telemetry formatted message (step 145). The unpacked data is then further processed resulting in a set of alerts and recommendations (step 150) consistent with the presence of the detected analyte.

Figure 2B:
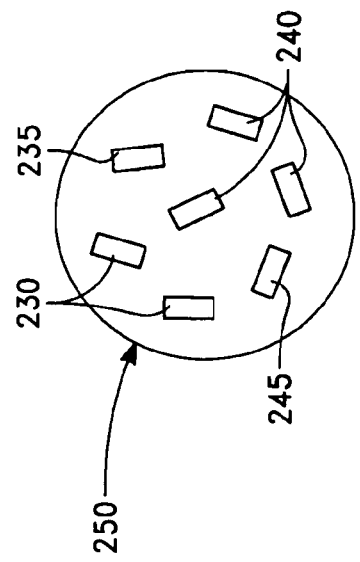
FIG. 2B is a drawing showing the different types of RFID sensors in a field of scattered sensors.
Figure 2A:
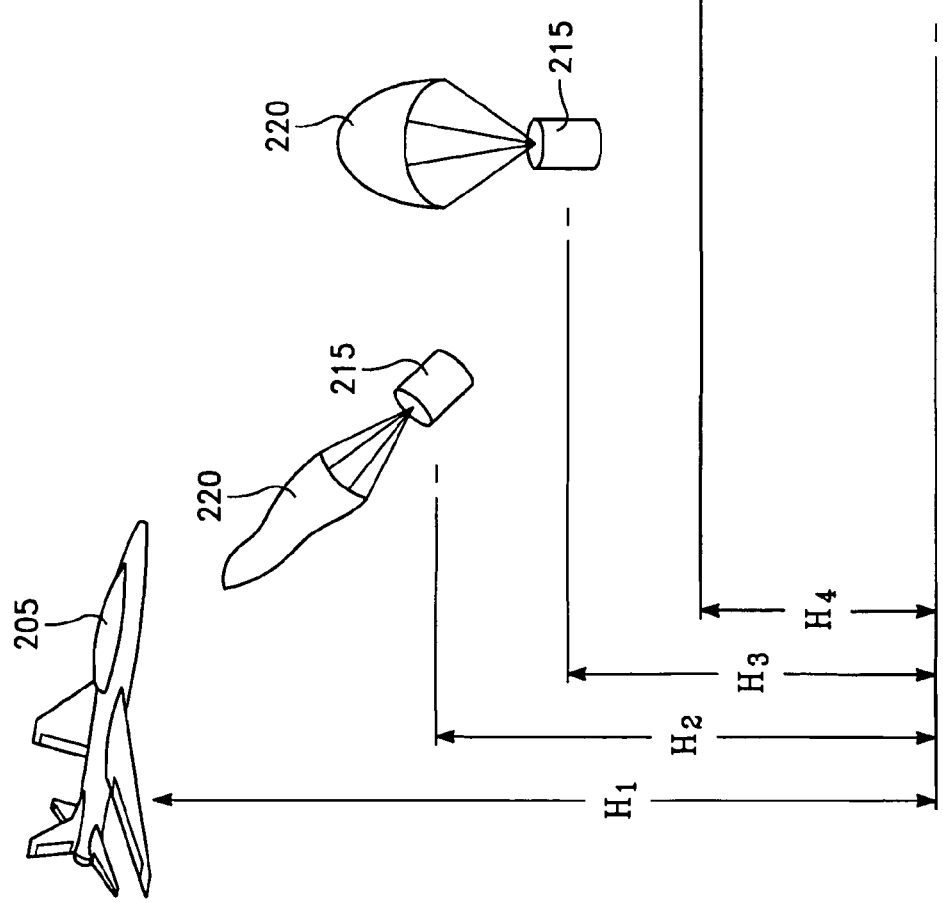
FIG. 2A is a drawing showing an overview of deploying an RFID sensor canister and its contents.
Figure 3:
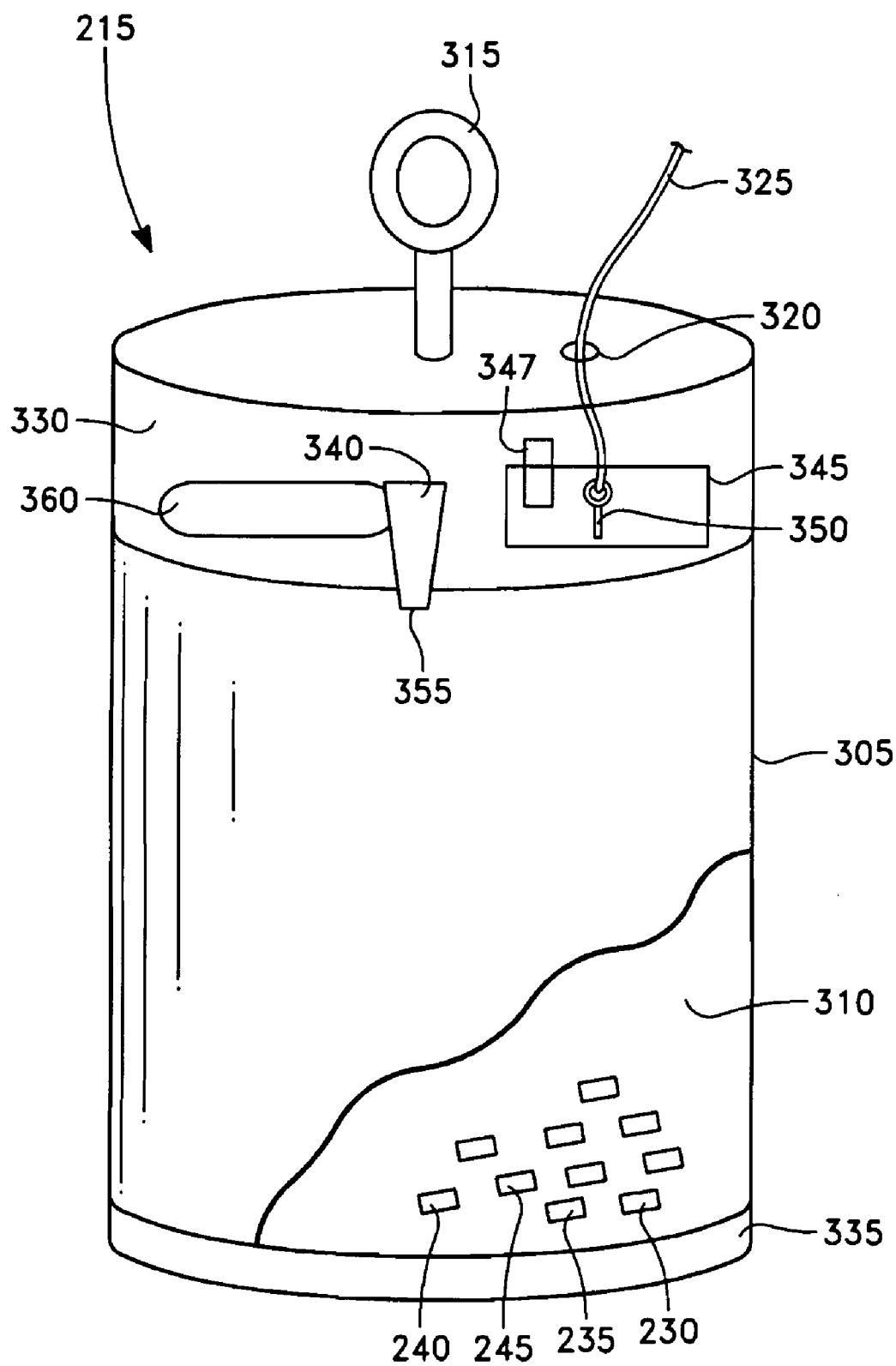
FIG. 3 is a drawing showing an internal and external view of an RFID sensor canister.

Referring to FIG. 2A, the phases of RFID sensor deployment are depicted. First, an unmanned air vehicle (UAV) 205 flies at an altitude of $H_1$ over an area to be monitored 210 and drops an RFID filled canister 215. Second, a closed parachute 220 deploys to an altitude of $H_2$ at which point a canister battery 347 (FIG. 3) provides power in the form of a battery voltage and a current flow to the canister electrical and electronics 345 (FIG. 3). Third, an open parachute 220 then serves as a means to control a canister orientation and a descent rate at altitude $H_3$. Canister orientation is crucial in that the RFID sensors are deployed from the end of the canister 215 facing the geographic area to be monitored 210. At an altitude of $H_3$ the canister electrical and electronic components 345 (FIG. 3) begin to monitor the altitude of the descending RFID filled canister 215. Fourth, when a preset altitude of $H_4$ is reached an output of the canister electrical and electronic components 345 (FIG. 3) trigger a deployment mechanism 340 (FIG. 3) to eject and scatter the contents of the RFID canister 215 about the area to be monitored 210. The deployment mechanism 340 (FIG. 3) utilizes a force created by releasing compressed air into a compartment 310 (FIG. 3) resulting in an ejection of the RFID sensors from the RFID canister 215. The RFID sensors (230, 235, 240, and 245) initially depart the RFID canister 215 with the force imparted by the compressed air and attain a terminal velocity wherein the terminal velocity is a function of gravity, the mass of the RFID sensor and an ambient air flow. The negligible mass of the RFID sensors ensures that an impact force with the ground does not interfere with RFID sensor (230, 235, 240, and 245) operation.

Referring to FIG. 2A, in one embodiment the UAV 205 altitude $H_1$ is in the range of one thousand five hundred feet to three hundred feet, $H_2$ is in the range of seventy-five feet to fifty feet below the UAV 205 altitude $H_1$, and $H_3$ is in the range of twenty feet to ten feet below the altitude of $H_2$ and altitude $H_4$ is in the range of one thousand feet to one hundred feet. Altitude $H_1$ range is expandable beyond that listed provided the size of the UAV 205 is increased. Increasing altitude $H_4$ results in a proportional increase in the size of the monitored area 210.

Figure 6:
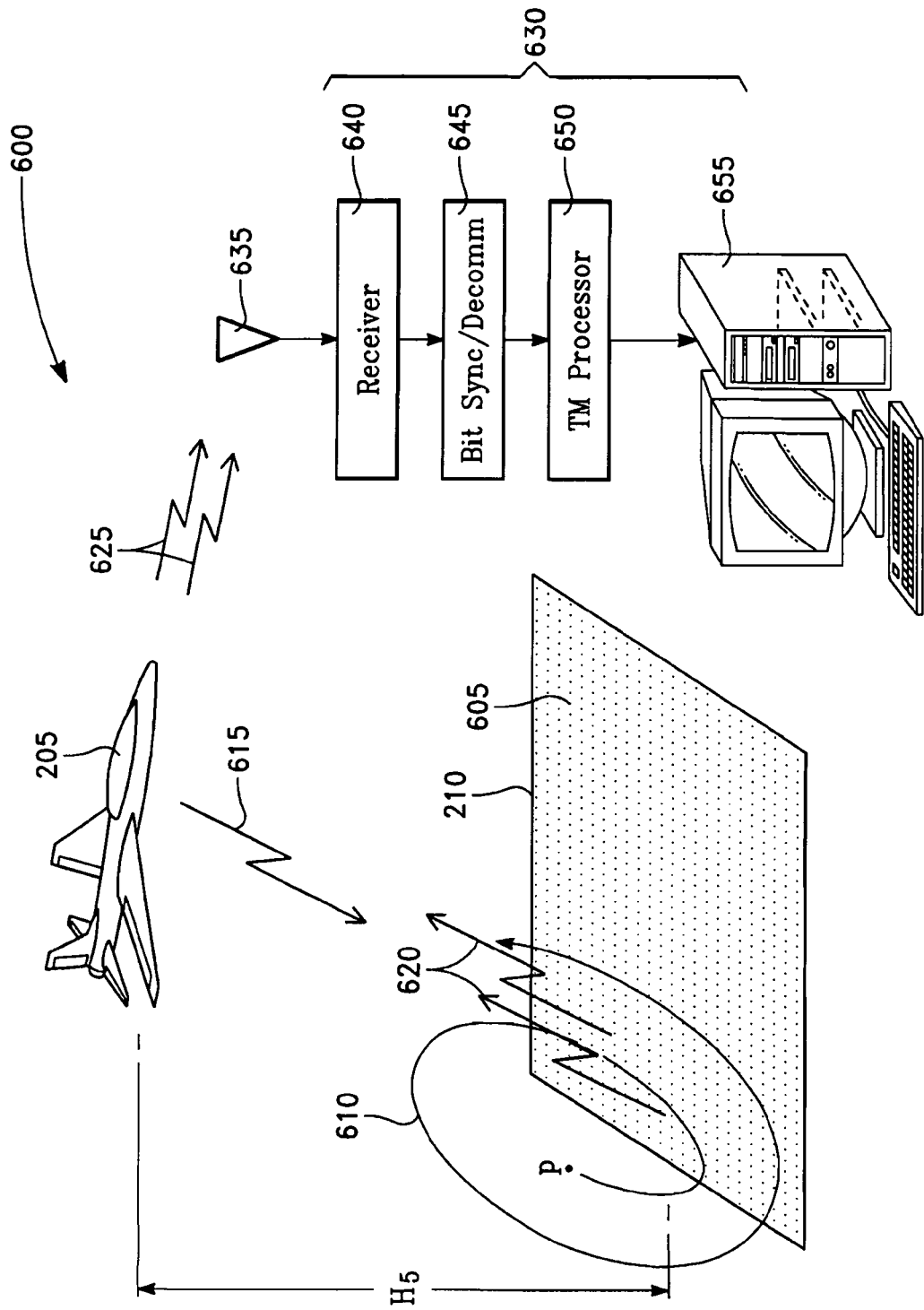
FIG. 6 is a drawing showing the RFID sensor system. The monitored area is overflown in a predetermined flight path by a UAV which interrogates and collects responses from the RFID sensors and communicates the collected responses to a ground receiving station.

The preferred embodiment utilizes a Predator drone as the UAV 205. The Predator drone has the characteristics of long range, ability to deliver a payload, adequate flight time, flight path programmability, sufficient power to operate an electronic suite of receivers and transmitters, is able to mark the GPS location coordinates and associate the GPS mark with a drop event, operates at speeds slow enough to perform interrogations and collect responses, and has hard points to mount RFID sensor canisters 215 for dropping. In the preferred embodiment, marking the GPS location coordinate and associating the GPS mark with the drop event for the RFID canister 215 is performed in order to designate a search pattern starting point "P" (FIG. 6). The search pattern 610 (FIG. 6) is necessary to ensure that the UAV 205 can return to the area to be monitored 210 and collect RFID sensor (230, 235, 240 and 245) responses.

Referring to FIG. 3, a detailed description of the RFID canister 215 construction and internal components follows. In the preferred embodiment a shell 305 for the RFID canister 215 is composed of a lightweight plastic material. The shell 305 houses and protects an RFID sensor compartment 310, provides an anchor point 315 for a parachute connection and contains an opening 320 for routing a firing pin lanyard 325. The shell 305 also houses and protects a deployment system compartment 330 for protecting a compressed air cylinder 360, a two way valve 340, the battery 347, an electronics circuit board 345, a firing pin 350 and a pressure released bottom plate 335. The opening 320 also serves as a pressure equalization port to equalize the air pressure within the deployment system compartment with the external atmospheric pressure.

Figure 4:
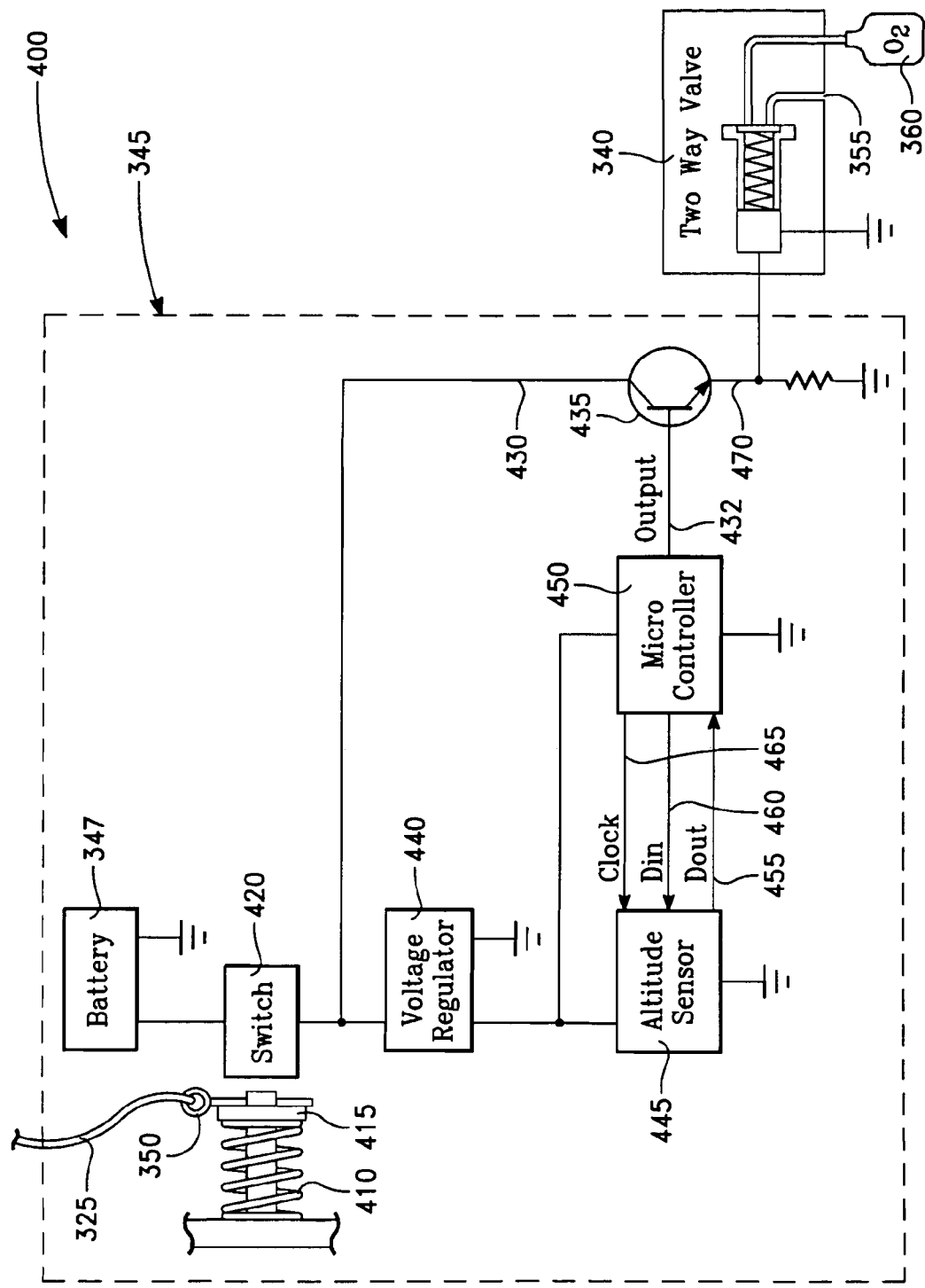
FIG. 4 is a drawing describing the power supply, electro-mechanical and electronic components internal to the RFID canister.

Referring to FIG. 4, a detailed description of the components of an RFID sensor deployment system 400 contained within the deployment system compartment 330 (FIG. 3) follows. The operation of the RFID sensor deployment system 400 begins with the pulling of the firing pin 350 by a pulling force imparted on the firing pin lanyard 325 exerted by the deployment of the parachute 220 (FIG. 2A). The absence of the firing pin 350 allows a spring 410 to decompress and push a plate 415 onto a piezoelectric switch 420.

The piezoelectric switch 420 senses the pressure applied by the plate 415 and closes its normally open contacts, allowing the battery 347 to supply power to several electrical devices and electronic devices mounted to the electronics circuit board 345. The piezoelectric switch 420 in the preferred embodiment is manufactured by Apem Components Incorporated and is available in their PBA product line. The preferred piezoelectric switch 420 has no moving parts, is small, completely sealed for harsh environments and can switch a maximum of 24 Volts DC at 1 ampere. This is well below the 12 Volts DC and 0.5 amperes of current supplied by the battery 347.

The output of the piezoelectric switch 420 is connected to a collector lead 430 of a transistor 435 and is also connected to a voltage regulator 440. The voltage regulator 440 accepts as input 12 Volts DC and outputs a regulated 3.0 Volts for powering an altitude sensor 445 and a microcontroller 450, all of which are mounted to the electronics circuit board 345. The altitude sensor 445 in the preferred embodiment is manufactured by Intersema Corporation and carries part number MS5534. The altitude sensor 445 in the preferred embodiment is accurate to one meter of altitude resolution, provides a digital output signal compatible with the input of the microcontroller 450, consumes power in the 200 micro-ampere range and has an altitude response ranging from a high of fifty thousand feet to a low of two thousand feet below sea level. The microcontroller 450 in the preferred embodiment is manufactured by EM Microelectronics Corporation and carries part number EM6626. The EM6626 is an all-in-one unit providing, a processor, a clock output, internal memory, random access memory, an instruction set, configurable input ports and configurable output ports. Application notes and technical data sheets for the preferred altitude sensor 445 and the preferred microcontroller 450 are available from the manufacturers.

The altitude sensor 445 and the microcontroller 450 communicate via a set of electrical interfaces. A portion of the electrical interfaces are labeled as CLOCK 465, DIN 460 (data in) and DOUT 455 (data out). The CLOCK 465 interface connects a clock output from the microcontroller 450 to the altitude sensor 445 for synchronizing the operation of the two devices (items 445 and 450). The DIN 460 interface couples control signals from the microcontroller 450 to influence the operation of the altitude sensor relative to sending altitude data. The DOUT 455 interface couples digital altitude data from the altitude sensor 445 to the internal input circuitry of the microcontroller 450. The microcontroller 450 is programmed in software utilizing the instruction set to process the altitude sensor data and to specifically detect a preset altitude point $H_4$ (FIG. 2A).

Upon the detection of the preset altitude point $H_4$ (FIG. 2A) the output circuitry of the microcontroller 450 outputs a base current to a base lead 432 of a transistor 435 causing the battery 347 voltage and current available at the collector lead 430 to flow to the emitter lead 470. The presence of battery 347 voltage and current at the emitter lead 470 actuates a two-way valve 340 allowing compressed oxygen that is stored in a cylinder 360 to escape through an output port 355.

Referring to FIG. 3, the escaping oxygen at the output port 355 pressurizes the RFID sensor compartment 310 of the RFID canister 305. The pressurization of the RFID sensor compartment 310 continues until the bottom plate 335 separates from the RFID canister 305. In the preferred embodiment the separation pressure force required to separate the bottom plate 335 from the RFID canister 305 is in the range of thirty to forty pounds per square inch. Significantly increasing the separation pressure force will result in damage to the RFID sensors (230, 235, 240, and 245).

The sudden separation of the bottom plate 335 and the pressure build up within the RFID sensor compartment 310 results in the ejection of all the RFID sensors (230, 235, 240, and 245) into the atmosphere. As the RFID sensors (230, 235, 240, and 245) descend they begin to detect the analyte for which they are sensitive. Detection arrays for detecting chemical agents, explosive material, biological agents and radiological agents using high electron mobility transistor (HMET) technology are known in the art. HMET based detection arrays integrated with electronic RFID circuitry are also known in the art. In the preferred embodiment the RFID sensor (230, 235, 240, and 245) is composed of an HMET detection array integrated with electronic RFID circuitry. The preferred embodiment uses electronic RFID circuitry comprising an antenna for receiving interrogation signals from an interrogator and for transmitting a response, a transceiver coupled to the antenna for communicating the responses of the HMET detector array, a unique identification code stored in internal memory and an interface coupling the HMET detection array to the transceiver. In one embodiment the electronic RFID circuitry and integrated HMET detection array is sensitive to one type of analyte. In another embodiment the electronic RFID circuitry and integrated HMET detection array is sensitive to multiple types of analyte. In yet another embodiment, the RFID sensors (230, 235, 240, and 245) are chemiresistors. Chemiresistors are fully described in U.S. Pat. No. 6,359,444 and are suitable for detecting a wide variety of analytes.

Referring to FIGS. 2A and 2B, the descending RFID sensors settle on the earth in a random pattern 250 about the area to be monitored 210. The separation between the individual RFID sensors (230, 235, 240, and 245) within the random pattern 250 is a function of the release altitude $H_4$, the pressure that separates the pressure released bottom plate (FIG. 3, item 335) from the RFID canister shell 305 (FIG. 3) and the prevailing wind speed and wind direction. In the preferred embodiment RFID sensor 230 detects an explosive agent, sensor 235 detects a biological agent, sensor 240 detects a radiological agent, and sensor 245 detects a chemical agent.

Figure 5:
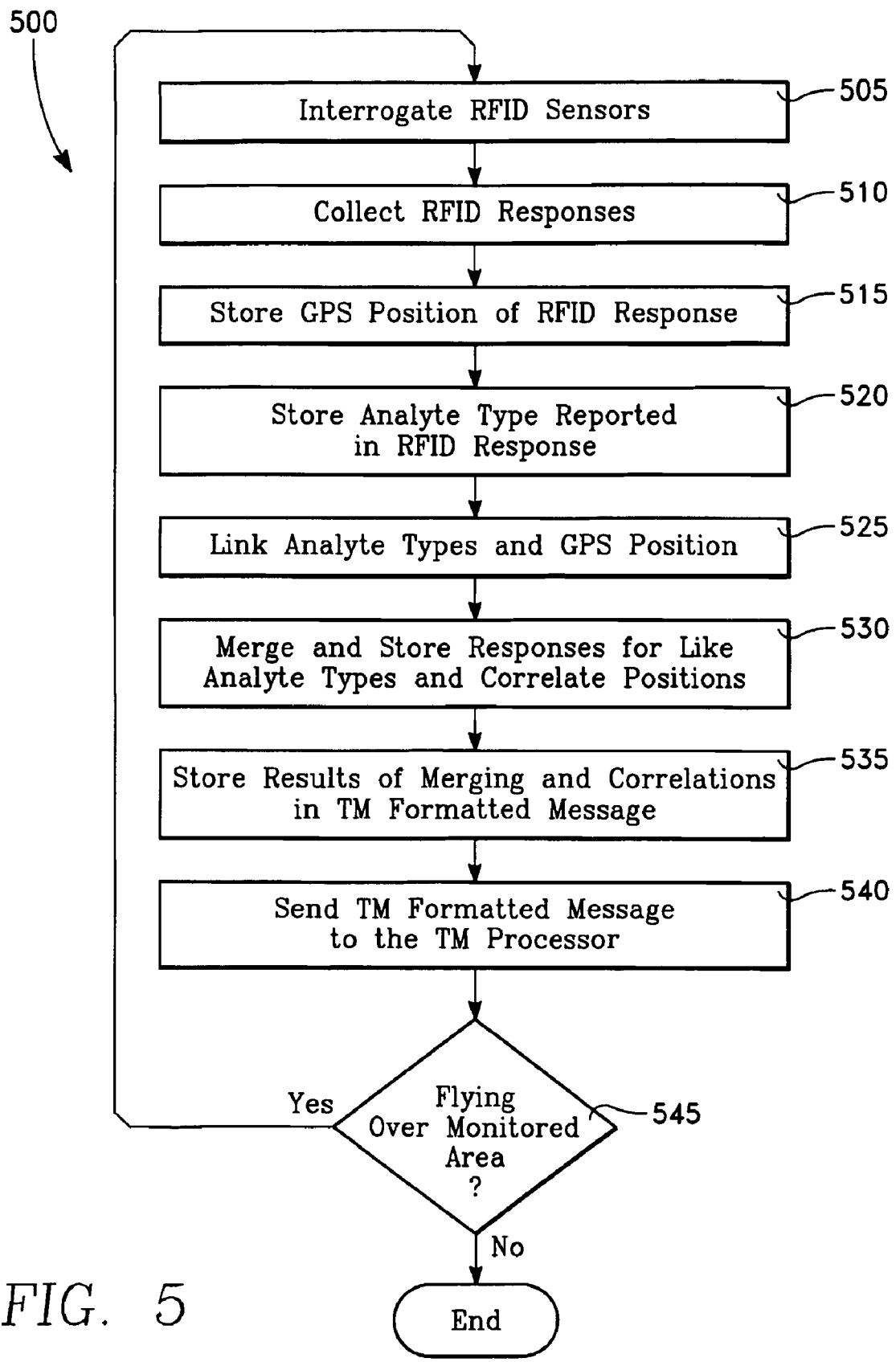
FIG. 5 is a flowchart describing the software processing and operational functionality that takes place onboard the UAV interrogator.

Referring to FIGS. 5 and 6, presented are a UAV software processing flowchart 500 describing the software processing steps performed onboard the UAV 205, and a graphical depiction 600 of the RFID system components. The UAV 205 returns to point P, which is coincident with the GPS mark for the dropped canister event, and begins to fly a spiral flight pattern 610 at an altitude of $H_5$. In the preferred embodiment the altitude of $H_5$ is in the range of fifty feet to two hundred feet. The altitude $H_5$ is limited by the aerodynamic capabilities of the UAV 205 and the efficiency of the interrogation response cycle. The UAV 205 initiates interrogations (step 505 and item 615) and collects RFID sensor responses (step 510 and item 620) for detection report processing. In the preferred embodiment the interrogation signal 615 is transmitted in an RF beam having a narrow RF beamwidth. The narrow RF beamwidth of the interrogation signal 615 is necessary to control the number of RFID sensor responses 620. Increasing the altitude $H_5$ for the UAV 205 leads to an increase in the number of RFID sensor responses 620 due to spreading of the effective area of the RF beamwidth that illuminates the monitored area 210. Decreasing the altitude $H_5$ for the UAV 205 leads to a decrease in the number of RFID sensor responses 620 due to a reduction of the effective area of the RF beamwidth that illuminates the monitored area 210. The GPS location coordinate of the interrogation is marked (step 505) and stored in a data structure. The RFID sensor responses 620 are collected during step 510. The RFID sensor responses 520 are also GPS marked (step 515) and stored in another data structure as a part of a detection report. Contained in the RFID sensor responses 620 are the type of analyte detected which is stored in yet another data structure (step 520) as part of the detection report. Software processing then links the GPS location coordinate with the type of analyte (step 525) and stores the linked results in yet another data structure. Software processing then invokes a correlation scheme to merge (step 530) the RFID sensor responses 620 that are alike and are located close together.

In one embodiment, the correlation scheme of step 530 invokes a simple square root of the sum of the squares using the GPS latitude and longitude coordinates for pairs of like RFID responses and compares them to a square correlation window having a dimension of one hundred feet per side. All like responses that fit within the square correlation window are merged as a single response with a single GPS location coordinate at the center of the window which are then stored in yet another data structure (step 530) as a merged detection report. Each set of merged responses are written into a telemetry (TM) formatted message (step 535). At the end of the interrogation response cycle the TM formatted message (step 535) contains header information describing the source and size of the TM message, as well as a data record for each set of merged responses. Each data record in the TM message is composed of a time stamp, a GPS location coordinate, an identification of the analyte, the sequence number for the interrogation cycle and the number of correlated responses that define the merged response. In the preferred embodiment the TM formatted message (step 535) contains the results of more than one interrogation response cycle. When the TM formatted message (step 535) has reached a maximum size the TM formatted message is sent to a TM processor (step 540). The interrogations 615, collection of responses 620 and transmission of the TM formatted message to the TM processor (step 540) continues until the area to be monitored 210 is no longer overflown by the UAV 205.

The widening of the spiral flight pattern 610 continues until the number of RFID responses 620 peak and then drop to near zero, which is an indication that the area to be monitored 210 is no longer being overflown (step 545). The spiral flight pattern 610 is a predetermined flight path configurable by the user prior to UAV takeoff.

Figure 7:
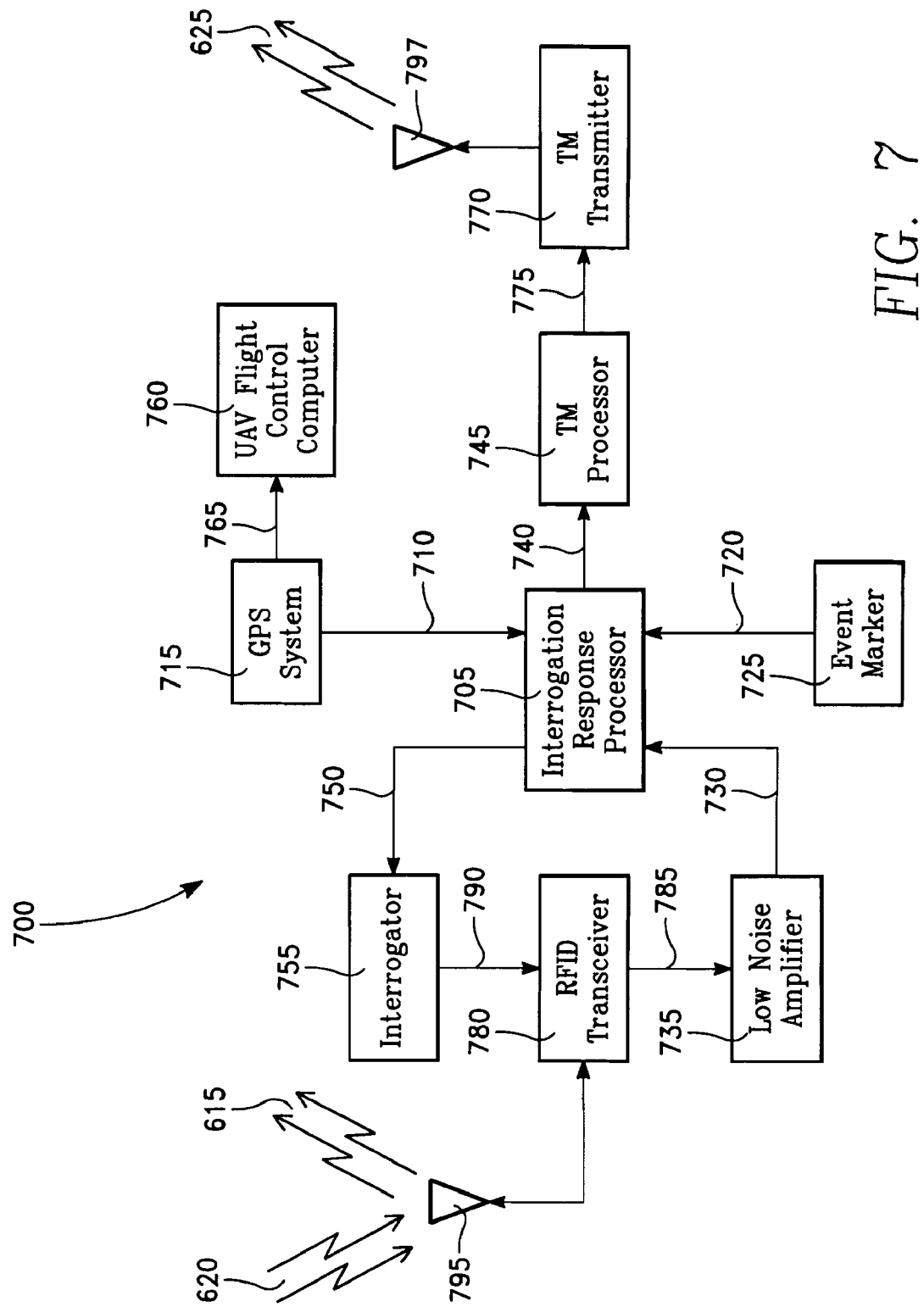
FIG. 7 is a drawing describing the hardware components comprising the RFID sensor system which are integrated with the UAV.

Referring to FIG. 7, we now turn to a description of the components located onboard the UAV 205 (FIG. 6) that implement the operational steps depicted in the UAV software processing flowchart 500 (FIG. 5). One skilled in the art of UAV system engineering will recognize and be able to carryout an implementation for each of the following described components in the novel manner in which they are assembled and used.

At the core of the RFID sensor system is an interrogation response processor 705 executing the steps described in the UAV software processing flowchart 500 (FIG. 5). The interrogation response processor 705 accepts as input a GPS signal 710 provided by a GPS system 715, an event marker signal 720 provided by an event marker system 725, and an amplified signal 730 output by a low noise amplifier 735. The interrogation response processor 705 sends a digital TM data stream 740 containing the TM formatted message 540 (FIG. 5) to a TM processor 745. The interrogation response processor 705 also provides an interrogation command signal 750 to an RFID sensor interrogator 755. The interrogation response processor 705 includes a central processing unit, internal read only memory to store a coded software program, random access memory to store data, input and output buffers for data manipulation, and multiple electrical interface circuits for communicating with these and other devices.

The GPS system 715 is coupled to a UAV flight control computer 760 by an electrical interface 765. The UAV flight control computer 760 is responsive to navigational data sent from the GPS system 715, where the navigational data from GPS system 715 is used to direct the UAV flight path, directs operating altitudes and provides GPS time for coordinating tasks.

The TM processor 745 communicates with a TM transmitter 770 via an electrical interface 775. The TM processor 745 accepts the digital TM data stream 740 containing the TM formatted message 540 (FIG. 5) and reformats the digital TM data stream 740 into a format suitable for transmission by the TM transmitter 770. The TM transmitter is coupled to a TM antenna 797 that is mounted onto the UAV 205 (FIG. 6). The TM antenna 797 provides a radio frequency downlink 625 directed towards a ground receiving station (FIG. 6 item 630).

An RFID transceiver 780 has an output line 785 connected to the low noise amplifier 735 and has an input line 790 connected to the interrogator 755. The low noise amplifier 735 filters and amplifies an output on the output line 785 of the RFID transceiver 780 where the output of the RFID transceiver 780 contains the RFID sensor responses 620. The interrogator 755 accepts commands to perform and cease interrogator operations as directed by the interrogation response processor 705. The RFID transceiver 780 is coupled to a combined transmit receive antenna 795 providing a means to transmit an interrogation RF link 615 and to receive a response RF link 620 necessary for communication with the RFID sensors (FIG. 6 item 605) scattered over the area to be monitored 210 (FIG. 6).

Referring to FIG. 6, the ground based receiving station 630 is now described. The ground based receiving station 630 includes a receive antenna 635 connected to an RF receiver 640. The output of the RF receiver 640 is connected to the input of a bit synchronizer and decommutation unit 645. The output of the bit synchronizer and decommutation unit 645 is connected to a telemetry processor 650 having an output connected to a computer station 655.

Figure 8:
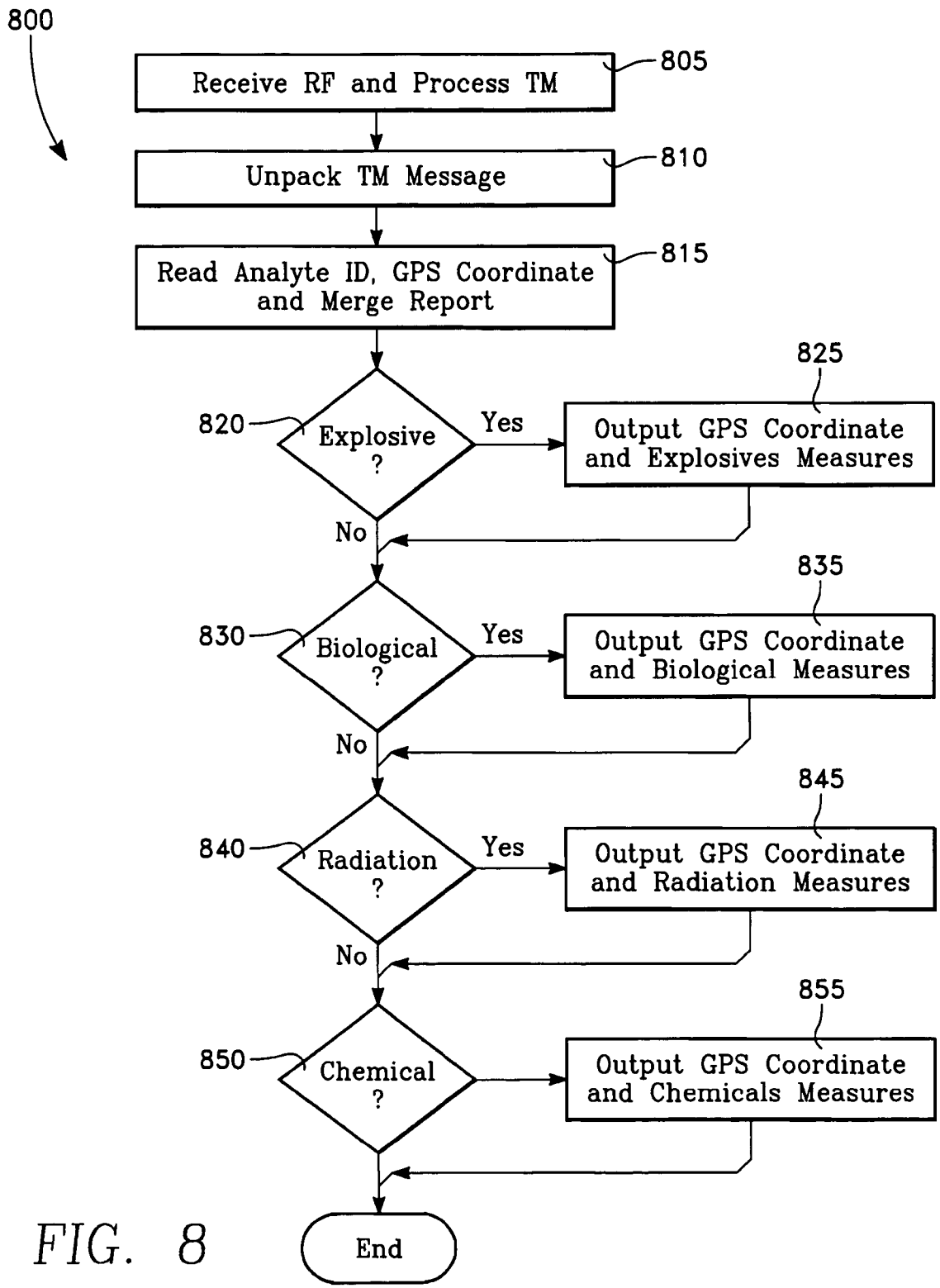
FIG. 8 is a lower level software flowchart describing the software processing that takes place within the ground receiving station which culminates in a set of recommendations consistent with the hazardous analyte detected.

Referring to FIGS. 6 and 8, item 800 is a software flowchart describing the processing steps performed by the ground based receiving station 630. The ground based receiving station 630 receives the UAV transmitted RF 625 at the receive antenna 635. In step 805 the UAV transmitted RF 625 is down converted in frequency and filtered for further processing by the bit synchronizer and decommucation unit 645. In step 810 the TM processor 650 unpacks the contents of the TM formatted message (FIG. 5 item 540) into a plurality of data records composed of the time stamp, the GPS location coordinate, the identification of the analyte, the sequence number for the interrogation cycle and the number of correlated responses that define the merged responses prepared by the interrogation response processor 705 (FIG. 7). The unpacked contents of the TM formatted message of step 810 are sent to the ground station computer 655 for further processing. The ground station computer 655 executes an analysis and recommendation algorithm which implements steps 815 through 855.

The analysis and recommendation algorithm begins by reading (step 815) from computer memory the time stamp, the GPS location coordinate, the identification of the analyte, the sequence number for the interrogation cycle and the number of correlated responses that define the merged responses unpacked (step 810) by the TM processor 650. A check (step 820) is made to determine whether an analyte is in the category of an explosive. If the analyte is in the category of an explosive then the corresponding GPS coordinate, an alert message, and a recommended action is output by the algorithm (step 825). The alert message is defined by a computer programmer based upon user requirements and includes graphics, text or an audible conveyance of the alert. The recommended action is defined by the computer programmer based upon user requirements and includes graphics, text or an audible conveyance of the recommended action. In the preferred embodiment an alert is a color coded textual message comprised of textual symbols that reads "EXPLOSIVE LAT coordinate LON coordinate". In the preferred embodiment a recommended action ranges from complete avoidance of the entire area to be monitored 210, avoidance of a circular area surrounding the coordinates of the explosives, or other precautions as determined by the type of explosive and the mission of the advancing force. Whether an explosive is detected or not a second check is made (step 830).

The second check (step 830) is made to determine whether an analyte is in the category of a biological material. If the analyte is in the category of a biological material then the corresponding GPS coordinate, an alert message, and a recommended action is output by the algorithm (step 835). The alert message is defined by a computer programmer based upon user requirements and includes graphics, text or an audible conveyance of the alert. The recommended action is defined by the computer programmer based upon user requirements and includes graphical symbols, textual symbols, any combination of graphical and textual symbols or an audible conveyance of the recommended action. In the preferred embodiment an alert is a color coded text message that reads "BIOLOGICAL LAT coordinate LON coordinate". In the preferred embodiment a recommended action ranges from complete avoidance of the entire area to be monitored 210, avoidance of a circular area surrounding the coordinates of the biological material, or other precautions as determined by the type of biological material and the mission of the advancing force. Whether a biological material is detected or not a third check is made (step 840).

The third check (step 840) is made to determine whether an analyte is in the category of a radioactive material. If the analyte is in the category of a radioactive material then the corresponding GPS coordinate, an alert message, and a recommended action is output by the algorithm (step 845). The alert message is defined by a computer programmer based upon user requirements and includes graphics, text or an audible conveyance of the alert. The recommended action is defined by the computer programmer based upon user requirements and includes graphics, text or an audible conveyance of the recommended action. In the preferred embodiment an alert is a color coded text message that reads "RADIATION LAT coordinate LON coordinate". In the preferred embodiment a recommended action ranges from complete avoidance of the entire area to be monitored 210, avoidance of a circular area surrounding the coordinates of the radioactive material, or other precautions as determined by the type of radioactive material and the mission of the advancing force. Whether a radioactive material is detected or not a fourth check is made (step 850).

The fourth check (step 850) is made to determine whether an analyte is in the category of a chemical agent. If the analyte is in the category of a chemical agent then the corresponding GPS coordinate, an alert message, and a recommended action is output by the algorithm (step 855). The alert message is defined by a computer programmer based upon user requirements and includes graphics, text or an audible conveyance of the alert. The recommended action is defined by the computer programmer based upon user requirements and includes graphics, text or an audible conveyance of the recommended action. In the preferred embodiment an alert is a color coded text message that reads "CHEMICAL LAT coordinate LON coordinate". In the preferred embodiment a recommended action ranges from complete avoidance of the entire area to be monitored 210, avoidance of a circular area surrounding the coordinates of the a chemical agent, or other precautions as determined by the type of a chemical agent and the mission of the advancing force.

The algorithms described herein may be programmed in any suitable programming language for operation on compatible computer processors and computer processing hardware. The computer language for the preferred embodiment is an object oriented language with error recovery features to allow algorithm execution in the presence of data or computer errors. The preferred embodiment is loaded onto a computer readable medium which may include, but are not limited to, memory disks, flash memory devices, optically read media, and mass storage devices.

One skilled in the art may adapt the applicant's invention to any platform that operates in any area for which there is a need to provide an assessment of the presence of hazardous material and such adaptation is within the scope of the present invention. It is necessary for the platform that is used for operating the algorithms described herein to have a power supply for supplying power to the computers, computer processors, memory storage devices, display heads, electrical interfaces and other associated hardware.

Although the present invention has been described in considerable detail with references to certain preferred versions thereof, other versions are possible. For example, RFID sensors of a type not described herein may be used. A series of deployed RFID canisters may be used to significantly increase the number and size of the area to be monitored. The UAV interrogator may climb to a higher altitude prior to transmitting the TM formatted message to the ground station in order to increase the overall effective distance of system operation. A TM relay in the form of an additional UAV or intermediate ground receiving station may be used to increase the overall effective distance of system operation. Another example of other embodiments includes permutations of described text and graphics are as numerous as there are fonts, colors, textures and user preferences. A suitable set of accepted graphical warning symbols for hazardous material are drawn from the symbols and signage adopted by the Occupational Safety and Health Administration and those adopted by the European Agency for Safety and Health at Work. Yet another example of alternative embodiments lies in the substitution of the plurality of records with an array of data structures, or with databases having data stored in retrievable datasets, or with matrices having data stored in retrievable data cells, or with other types of data structures that can store and access data.

It is necessary for the airborne platform that is used for operating delivering the RFID canister and operating the algorithms described herein to have a power supply for powering the navigation computers, the computer processors, the memory storage devices, the electrical interfaces, telemetry components and other associated hardware.

Therefore, the spirit and scope of the appended claims should not be limited to the description of the preferred versions contained herein.

What is claimed is:

1. An airborne passive radio frequency identification (RFID) system comprising:
   an unmanned air vehicle;
   at least one RFID canister separable from said unmanned air vehicle;
   a parachute for controlling a descent of a separated RFID canister;
   a plurality of RFID sensors contained within said separated RFID canister;
   a scattering mechanism contained within said separated RFID canister to scatter said plurality of RFID sensors over an area to be monitored resulting in an RFID monitored area;
   a transceiver contained within said unmanned air vehicle for sequencing an interrogation signal and a response signal wherein said interrogation signal and said response signal are in communication with said plurality of RFID sensors;
   an interrogation response processor contained within said unmanned air vehicle for processing said interrogation signal and said response signal;
   a telemetry system partially contained within said unmanned air vehicle for communicating an output of said interrogation response processor to a receiving station;
   a computer in communication with said receiving station wherein said computer processes said output of said interrogation response processor as transmitted by said telemetry system and received by said receiving station;
   a shell to protect an RFID sensor compartment containing said plurality of RFID sensors and to protect a deployment system compartment containing said scattering mechanism wherein said RFID compartment and said deployment system compartment communicate using a two way valve;
   an opening in said shell wherein said opening is an access for passing a firing pin lanyard;
   said opening operating as a pressure equalization port wherein said pressure equalization port equalizes an air pressure within said deployment system compartment with an external air pressure; and
   a parachute anchor point connected to said shell for anchoring said parachute.

2. An airborne passive radio frequency identification (RFID) system comprising:
   an unmanned air vehicle;
   at least one RFID canister separable from said unmanned air vehicle;
   a parachute for controlling a descent of a separated RFID canister;
   a plurality of RFID sensors contained within said separated RFID canister;
   a scattering mechanism contained within said separated RFID canister to scatter said plurality of RFID sensors over an area to be monitored resulting in an RFID monitored area;
   a transceiver contained within said unmanned air vehicle for sequencing an interrogation signal and a response signal wherein said interrogation signal and said response signal are in communication with said plurality of RFID sensors;
   an interrogation response processor contained within said unmanned air vehicle for processing said interrogation signal and said response signal;
   a telemetry system partially contained within said unmanned air vehicle for communicating an output of said interrogation response processor to a receiving station;
   a computer in communication with said receiving station wherein said computer processes said output of said interrogation response processor as transmitted by said telemetry system and received by said receiving station;
   a firing pin;
   a spring kept in a state of compression by said firing pin;
   a firing pin lanyard for removing said firing pin, said firing pin lanyard having a first end connected to said firing pin, said firing pin lanyard having a second end connected to said parachute wherein a deployment of said parachute removes said firing pin resulting in a decompression of said spring;
   a piezoelectric switch which is activated in response to said decompression of said spring wherein activating said piezoelectric switch connects a battery supply to a collector lead of a transistor and connects said battery supply to an input of a voltage regulator;
   an altitude sensor for sensing an altitude for said separated RFID canister, said altitude sensor having a power input port connected to an output voltage port of said voltage regulator, said altitude sensor having an altitude data output port wherein said altitude data output port communicates an altitude measurement;
   a microcontroller for processing said altitude measurement, said microcontroller having an input data port connected to said altitude data output port, said microcontroller having a triggering output port connected to a base lead of said transistor wherein said triggering output port communicates a result of said microcontroller processing said altitude measurement;
   a valve connected to an emitter lead of said transistor wherein said valve is activated by a voltage present at the emitter lead of said transistor, said valve controlling a release of a compressed gas into said RFID canister creating a pressure build up within said RFID canister to exert a separating force on a bottom plate of said RFID canister resulting in a scattering of said plurality of RFID sensors when said bottom plate is separated from said RFID canister.

3. The airborne passive radio frequency identification (RFID) system of claim 1, wherein said plurality of RFID sensors is further comprised of:
   at least one RFID sensor to detect an explosive agent;
   at least one RFID sensor to detect a chemical agent;
   at least one RFID sensor to detect a biological agent; and
   at least one RFID sensor to detect a radiological agent.

4. The airborne passive radio frequency identification (RFID) system of claim 1, in which said plurality of RFID sensors comprises at least one RFID sensor selected from the group consisting of an explosive agent RFID sensor, a chemical agent RFID sensor, a biological agent RFID and a radiological agent RFID sensor.

5. The airborne passive radio frequency identification (RFID) system of claim 1, wherein said telemetry system includes a ground based receiving station comprised of:
- a telemetry antenna for collecting a transmitted telemetry stream transmitted from said unmanned air vehicle;
- a receiver having a receiver input port and having a receiver output port wherein said receiver input port is connected to said telemetry antenna;
- a bit synchronizer having an bit synchronizer input port connected to said receiver output port of said bit receiver, said bit synchronizer synchronizing said telemetry stream transmitted from said unmanned air vehicle, said bit synchronizer having a bit synchronizer output port;
- a decommutation unit having a decommutation input port connected to said bit synchronizer output port of said bit synchronizer, said decommutation unit decommutataing said telemetry stream transmitted from said unmanned air vehicle, said decommutation unit having a decommutation output port; and
- a telemetry processor having a telemetry processor input port connected to said decommutation output port of said decommutation unit, said telemetry processor having a telemetry processor output port wherein said telemetry processor outputs data corresponding to a content of said telemetry stream transmitted from said unmanned air vehicle.

6. The airborne passive radio frequency identification (RFID) system of claim 1, wherein said unmanned air vehicle maneuvers along a predetermined flight path wherein said predetermined flight path begins at an RFID canister drop point coordinate and encompasses said area to be monitored.

7. The airborne passive radio frequency identification (RFID) system of claim 1, wherein said computer system operates a software algorithm, said software algorithm having an output for conveying to a user a plurality of alerts and a plurality of corresponding recommended measures wherein said plurality of alerts and said plurality of corresponding recommended measures are adopted by said user to modify a mission.

8. An passive radio frequency identification (RFID) system for detecting a plurality of substances comprising:
- means for detecting said plurality of substances whereby said means for detecting provides for and results in an identification of said plurality of substances;
- means for airborne delivery of said means for detecting;
- means for scattering said means for detecting over an area whereby a scattering of said means for detecting results in an area to be monitored;
- means for communicating with said means for detecting which are located within said area to be monitored whereby said means for communication outputs a detection report;
- means for detection report processing whereby said means for detection report processing outputs a telemetry message obtained from processing said detection report;
- means for transmitting said telemetry message;
- means for receiving said telemetry message whereby said means for receiving outputs a received telemetry message;
- means for processing said received telemetry message whereby said means for processing produces a processed telemetry message;
- means for converting said processed telemetry message into an observable alert and an observable recommendation;
- means for conveying said observable alert and said observable recommendation to a user;
- means for directing a current flow originating from a power supply means;
- an altitude sensing means for sensing an altitude of said means for scattering whereby said altitude sensing means has an altitude output;
- means for controlling a switching means whereby said switching means is responsive to said altitude output; and
- pressurization means for exerting a separation pressure on said means for scattering whereby activation of said pressurization means is responsive to said switching means.

9. The passive radio frequency identification (RFID) system of claim 8, whereby said means for detecting said plurality of substances is further comprised of:
- means for detecting an explosive agent;
- means for detecting a chemical agent;
- means for detecting a biological agent; and
- means for detecting a radiological agent.

10. The passive radio frequency identification (RFID) system of claim 8, whereby said means for transmitting is further comprised of:
- means for collecting a transmitted telemetry stream whereby said means for collecting said transmitted telemetry stream includes a collected telemetry stream output;
- said means for receiving said collected telemetry stream output whereby said means for receiving includes a receiver output;
- means for synchronizing said receiver output whereby said means for synchronizing includes a synchronized output;
- means for decommutating said synchronized output whereby said means for decommutating includes a decommutated output; and
- means for processing said decommutated output whereby said means for processing includes said processed telemetry message.

11. The passive radio frequency identification (RFID) system of claim 8, whereby said means for airborne delivery is further comprised of:
- means for flying along a predetermined flight path;
- means for changing an altitude of said means for airborne delivery; and
- navigation means for determining a latitude, longitude and altitude of said means for airborne delivery.

12. The passive radio frequency identification (RFID) system of claim 8, whereby said means for processing said received telemetry message is further comprised of:
- a first software means to retrieve said identification of said plurality of substances from said processed telemetry message;
- second software means to retrieve a merged detection report from said processed telemetry message;
- a third software means to retrieve a location coordinate from said processed telemetry message; and
- a fourth software means to format an output of said first software means, an output of said second software means, and an output of said third software means into a format compatible for processing by said means for converting.

13. A method for using an airborne passive radio frequency identification (RFID) system to identify a type of hazardous material, said method comprising the steps of:
- dropping a canister containing a plurality of RFID sensors wherein said RFID sensors are dropped from an airborne vehicle at a predetermined coordinate;
- recording in a first computer memory a first global positioning coordinate of said predetermined coordinate;
- scattering said plurality of RFID sensors over an area wherein said scattering results in a monitored area and said monitored area is monitored for the presence of said type of hazardous material;
- flying a predetermined flight path wherein said predetermined flight path is flown over said monitored area;
- identifying said type of hazardous material using said plurality of RFID sensors;
- interrogating each of said plurality of RFID sensors to obtain a response from each of said plurality of RFID sensors wherein said response identifies said type of hazardous material present in said monitored area;
- recording in a second computer memory a second global positioning coordinate of said response;
- storing in a third computer memory a first retrievable dataset wherein said first retrievable dataset includes said type of hazardous material present in said monitored area and said second global positioning coordinate of said response;
- operating a first computer software program operatively coupled to said retrievable dataset wherein said first computer software program includes a correlation window calculation;
- applying said correlation window calculation to a content of said first retrievable dataset wherein said content includes said type of hazardous material present in said monitored area and said second global positioning coordinate of said response resulting in a merged detection report;
- transmitting said merged detection report in a telemetry message to a telemetry receiver wherein said telemetry receiver is operatively coupled to a second computer software program;
- handling and interpreting said telemetry message received by said telemetry receiver wherein said second computer software program handles and interprets said telemetry message resulting in a second retrievable dataset;
- storing said second retrievable dataset in a fourth computer memory wherein said second retrievable dataset includes said merged detection report;
- converting said merged detection report into an observable alert and an observable recommendation using an analysis and recommendation algorithm; and
- conveying said observable alert and said observable recommendation to a user.

14. The method for using an airborne passive radio frequency identification (RFID) system of claim 13, wherein said scattering step further includes:
- directing a current flow originating for a power supply, said power supply providing said current flow to an altitude sensor, a switch and a valve;
- sensing an altitude utilizing an altitude sensor having an altitude measurement output;
- controlling a switch whereby said switch is responsive to said altitude measurement output; and
- exerting a separation pressure force whereby an activation of a valve produces said separation pressure force, said activation of said valve is responsive to said switch, and said separation force is generated by releasing a compressed gas through said valve upon said activation of said valve.

15. The method for using an airborne passive radio frequency identification (RFID) system of claim 13, wherein said identifying step further includes:
- identifying an explosive agent;
- identifying a chemical agent;
- identifying a biological agent; and
- identifying a radiological agent.

16. The method for using an airborne passive radio frequency identification (RFID) system of claim 13, wherein said flying step further includes:
- changing an altitude of said airborne vehicle wherein said altitude is in the range of 50 feet to 200 feet above a ground level;
- flying a spiral flight pattern over said monitored area; and
- determining a latitude, longitude and altitude position of said airborne vehicle while flying said spiral flight pattern using a global positioning system and a flight control computer.

17. The method for using an airborne passive radio frequency identification (RFID) system of claim 13, in which said plurality of RFID sensors comprises at least one RFID sensor selected from the group consisting of an explosive agent RFID sensor, a chemical agent RFID sensor, a biological agent RFID and a radiological agent RFID sensor.

18. The method for using an airborne passive radio frequency identification (RFID) system of claim 13, wherein said conveying step further includes:
- presenting to said user a graphical display wherein said graphical display includes a plurality of graphical symbols identifying said type of hazardous material and said second global positioning coordinate;
- presenting to said user a textual display wherein said textual display includes a plurality of textual symbols identifying said type of hazardous material and said second global positioning coordinate;
- presenting to said user a combined display, said combined display including a combination of said graphical symbols and said textual symbols wherein said combined display identifies said type of hazardous material and said second global positioning coordinate; and
- presenting to said user a recommended measure based upon an output of said analysis and recommendation algorithm wherein said recommended measure is displayed on said graphical display, is displayed on said textual display and is displayed on said combined display.

* * * * *